No. 761,437. PATENTED MAY 31, 1904.
D. W. BARR.
NAILLESS HORSESHOE.
APPLICATION FILED OCT. 27, 1903.
NO MODEL.
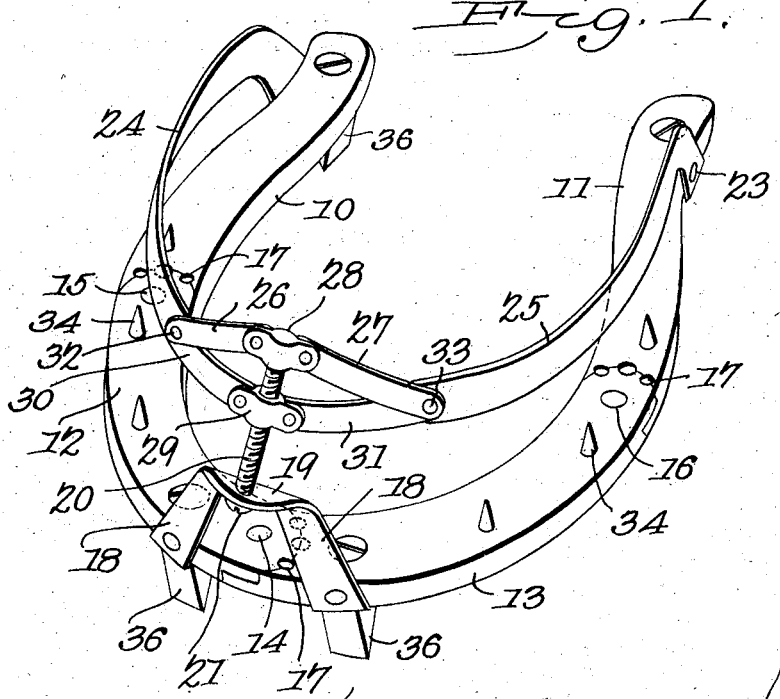
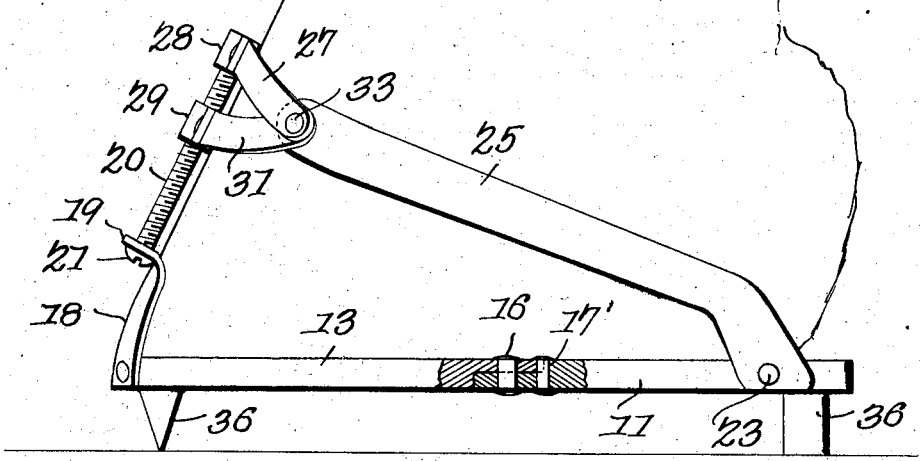
Witnesses
E. F. Stewart
G. H. Woodward
David W. Barr,
Inventor.
by C. A. Snow & Co.
Attorneys
THE NORRIS PETERS CO., PHOTO-LITHO., WASHINGTON, D. C.

No. 761,437.

Patented May 31, 1904.

UNITED STATES PATENT OFFICE.

DAVID WESLEY BARR, OF SIOUX CITY, IOWA.

NAILLESS HORSESHOE.

SPECIFICATION forming part of Letters Patent No. 761,437, dated May 31, 1904.

Application filed October 27, 1903. Serial No. 178,750. (No model.)

*To all whom it may concern:*

Be it known that I, DAVID WESLEY BARR, a citizen of the United States, residing at Sioux City, in the county of Woodbury and State of Iowa, have invented a new and useful Nailless Horseshoe, of which the following is a specification.

This invention relates to horseshoes, and has for its object to produce a device of this class which may be clamped to the hoof without using nails and which may be adjusted to fit different-sized hoofs.

The invention consists in certain novel features of construction, as hereinafter shown and described, and specified in the appended claims.

In the drawings illustrative of the invention, in which corresponding parts are denoted by like designating characters, Figure 1 is a perspective view, and Fig. 2 is a side elevation, of the improved horseshoe shown applied. Fig. 3 is a perspective detail of the detachable coupling means of the side straps.

The improved device comprises a horseshoe of the usual shape formed of heel-sections 10 11 and toe-sections 12 13, the toe-sections movably united centrally by a pivot-pin 14 and the heel-sections movably connected, respectively, with the toe-sections by pivot-pins 15 16, by which means the shoe may be adjusted laterally to fit various-sized hoofs.

At the joints between the shoe-sections a plurality of transversely-extending rivet-cavities 17 are formed, partially in each section, to receive fastening-rivets 17' for holding the sections after they have been adjusted to the desired position. By this arrangement it is obvious the shoe may be adjusted laterally to exactly fit the hoof of the animal, and then by inserting rivets in the cavities 17 the sections may be rigidly united and the adjustment maintained.

Attached to the front or "toe" end of the shoe is a toe-clip 18, formed, preferably, of spring-steel and riveted to the sections 12 13 upon opposite sides of the central joint 14, the upper end of the toe-clip being bent laterally, as at 19, and perforated to receive a threaded rod 20, having a head 21, rotatively supported in the toe-clip for a purpose hereinafter described. Pivoted at 22 23 to the free ends of the heel-sections 10 11 are side straps 24 25, extending forwardly and upwardly over the toe portion of the shoe and pivotally connected by links 26 27 with a central clip 28, having a seat or socket resting upon the free upper end of the threaded rod 20, in which socket the latter rotates.

Engaging the rod 20 is a threaded clip 29, connected by pivoted links 30 31 with the side straps 24 25 by the pivots 32 33 which connect the links 26 27 with said straps 24 25.

Projecting from the upper face of the shoe-sections are pointed spurs 34, spaced apart and adapted to engage the hoof of the animal when the shoe is attached to prevent lateral displacement of the shoe.

The pivot 23 is designed to hold the strap 25 permanently upon the heel-section 11, while the pivot 22 has a head extending laterally in both directions, and the stock of the pivot is threaded into the member 10, the head adapted to detachably engage an aperture 35 in the strap member 24, as shown in Fig. 3. By this means the pivot 23 may be screwed up tightly against the shoe member and prevent any tendency of the strap to work loose.

The improved shoe is applied as follows: The jointed sections are adjusted to fit the hoof and the rivets secured in the cavities 17, as above described, to maintain the desired adjustment. The strap member 24 is then disconnected from the hooked pivot 22 and the shoe placed in proper position upon the hoof. This strap member 24 is then connected by placing the aperture 35 over the hook-pivot 22 and the screw-rod 20 rotated to move the clip member 29 downward, which exerts a powerful strain upon the straps, distending the links 26 27 and 30 31, and thus firmly clamping the shoe to the hoof. The weight of the animal causes the spurs 34 to project into the hoof and hold the shoe against lateral displacement. Should the shoe become loosened, it can be quickly tightened by a few turns of the threaded rod 20. By this simple means the shoe can be adjusted exactly to the hoof and firmly clamped thereon without the necessity for driving nails or other fastenings into the hoof, and in event of the parts working loose it can be quickly tightened. Detachable calks 36 may be attached to the under side of the shoe-sections, if desired, the latter being preferably arranged as in patent issued to me March 17, 1903, No. 722,935.

The straps, links, and clips will preferably be of steel of sufficient strength to withstand the strains to which they will be subjected, but may be of other metal or combinations of metals, such as brass, aluminium steel, galvanized iron, or the like.

The shoe may be formed in as many of the hinged sections as required, and I do not, therefore, wish to be limited to any specific number, and this device may be modified in minor particulars without departing from the principle of the invention or sacrificing any of its advantages.

Having thus described the invention, what is claimed is—

1. A horseshoe intermediately jointed permitting lateral adjustment, apertures formed partially in each section at said joints to receive binding-rivets, and clamping means for detachably connecting said shoe with the hoof.

2. The combination with a horseshoe of side clamping-straps pivoted at their rear ends to the heel portion of the shoe, a threaded rod mounted for rotation upon the toe portion of said shoe, a clip movably engaging the free end of said rod and connected by pivoted links with the free ends of said side straps, a clip having a threaded aperture engaging said threaded rod, and links pivoted at their adjacent ends to said threaded clip and at their outer ends to the forward ends of said side straps.

3. A horseshoe having a joint at the toe permitting lateral adjustment, a toe-clip formed of a substantially U-shaped resilient member rigidly connected by its leg members with said shoe upon opposite sides of said joint, side straps pivoted at their rear ends to the heel portions and extending over the toe portions of the shoe, a threaded rod mounted for rotation in said toe-clip, a clip member movably engaging the free end of said threaded rod and connected with the forward ends of said side straps by pivoted links, a clip member having a threaded aperture engaging said threaded rod and connected with the forward ends of said side straps by pivoted links.

4. A horseshoe having a central joint at the toe and intermediate joints at the sides permitting lateral adjustment, a toe-clip formed of a substantially U-shaped resilient member connected at its ends to the shoe at opposite sides of said central joint, side straps pivoted to the heel portions and extending over the toe portions of the shoe, a threaded rod mounted for rotation in said toe-clip, a clip member movably supported upon the free end of said rod, and pivotally connected by links with the forward ends of said side straps, a clip having a threaded aperture engaging said threaded rod and connected by pivoted clips with the forward ends of said side straps.

5. In combination with a horseshoe having a stud extending from one of its heel portions and formed with a laterally-extended head, a side strap having an elongated aperture for detachable connection to said headed stud, a side strap pivotally connected to the other of said heel portions, means for movably connecting the free ends of said straps, and means for adjustably connecting said united strap ends to the toe portion of the horseshoe.

6. A horseshoe having its body formed of a plurality of jointed sections to permit lateral adjustment, apertures formed partially in the adjacent edges of each section at the joint, and binding means engaging said apertures to hold the shoe in adjusted shape, as set forth.

In testimony that I claim the foregoing as my own I have hereto affixed my signature in the presence of two witnesses.

DAVID WESLEY BARR.

Witnesses:
F. W. SARGENT,
M. COE.